United States Patent
Villessot et al.

(10) Patent No.: US 8,212,686 B2
(45) Date of Patent: Jul. 3, 2012

(54) DEVICE FOR BIDIRECTIONAL REMOTE WATER-METER READING BY MEANS OF RADIO, FOR INVOICING IN A ACCORDANCE WITH CONSUMPTION TIME BANDS

(75) Inventors: Daniel Villessot, Paris (FR); Marc Guerquin, Noisy le Roi (FR)

(73) Assignee: Suez Environnement, Paris (FR)

( * ) Notice: Subject to any disclaimer, the term of this patent is extended or adjusted under 35 U.S.C. 154(b) by 1028 days.

(21) Appl. No.: 12/160,367

(22) PCT Filed: Jan. 9, 2007

(86) PCT No.: PCT/FR2007/000031
§ 371 (c)(1),
(2), (4) Date: Jul. 9, 2008

(87) PCT Pub. No.: WO2007/080309
PCT Pub. Date: Jul. 19, 2007

(65) Prior Publication Data
US 2010/0219982 A1   Sep. 2, 2010

(30) Foreign Application Priority Data

Jan. 10, 2006 (FR) ...................................... 06 00194

(51) Int. Cl.
*G08C 17/02* (2006.01)
*G08C 15/06* (2006.01)
*G08B 23/00* (2006.01)

(52) U.S. Cl. ................................................. 340/870.02
(58) Field of Classification Search .............. 340/870.02
See application file for complete search history.

(56) References Cited

U.S. PATENT DOCUMENTS

| | | | |
|---|---|---|---|
| 6,366,217 B1 * | 4/2002 | Cunningham et al. ... | 340/870.31 |
| 6,657,552 B2 * | 12/2003 | Belski et al. ............. | 340/870.02 |
| 6,853,309 B1 | 2/2005 | Schroter et al. | |
| 7,400,264 B2 * | 7/2008 | Boaz ......................... | 340/870.02 |
| 7,429,933 B2 * | 9/2008 | Brennan et al. .......... | 340/870.07 |
| 2002/0089428 A1 | 7/2002 | Walden et al. | |

FOREIGN PATENT DOCUMENTS

| | | |
|---|---|---|
| EP | 0809374 | 11/1997 |
| WO | WO-9965169 | 12/1999 |

\* cited by examiner

*Primary Examiner* — Hal Kaplan
(74) *Attorney, Agent, or Firm* — Connolly Bove Lodge & Hutz LLP

(57) ABSTRACT

The present invention relates to a remote water-meter reading device (8) that comprises an assembly (10) for acquiring consumption data and comprising at least one radio transmitter for transmitting the information acquired, at least one radio receiver incorporated into the acquisition assembly (10) so as to enable said device (1) to communicate in both directions in order to receive the information from a central unit (2), and an antenna (11) so that said central unit can transmit time/date information such that this transmission of information taken into account by said radio receivers makes it possible to guarantee exact timing/dating of all the acquisition assemblies (10) of the meters that form one and the same lot, characterized in that said meter (8) initiates a volume-consumed measurement at a time determined by a first timing/dating received from the central unit (2) by the receiver and stops it at a time determined by a second timing/dating received from the central unit (2) by the receiver, the volume consumed in the interval between the two timings/datings being stored in a memory and then transmitted to said central unit (2) via the transmitter at a later time.

Figure 1:
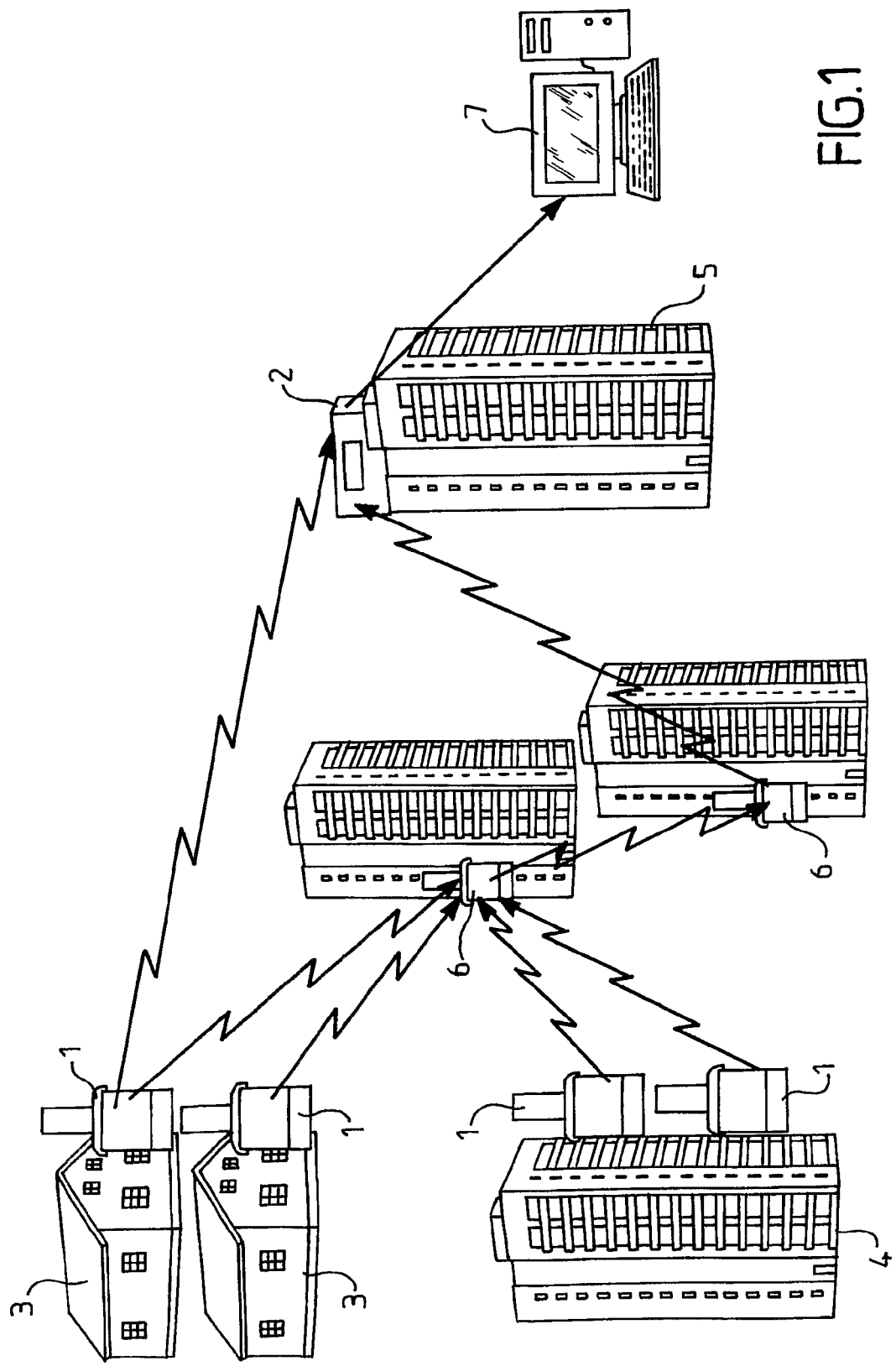

15 Claims, 2 Drawing Sheets

DEVICE FOR BIDIRECTIONAL REMOTE WATER-METER READING BY MEANS OF RADIO, FOR INVOICING IN A ACCORDANCE WITH CONSUMPTION TIME BANDS

CROSS REFERENCE TO RELATED APPLICATIONS

This application is a National Phase filing under 35 U.S.C. §371 of PCT/FR2007/000031 filed Jan. 9, 2007, which claims priority to Patent Application No. 0600194, filed in France on Jan. 10, 2006. The entire contents of each of the above-applications are incorporated herein by reference.

The present invention relates generally to remote water meter reading devices comprising a consumption data acquisition assembly and comprising at least one radio emitter for transmitting the information acquired, at least one radio receiver integrated into the acquisition assembly in such a way as to render said device communicating in both directions so as to receive the information from a central facility and an antenna so that said central facility can send time-stamping information so that this information transmission taken into account by said radio receivers makes it possible to guarantee exact time-stamping of all the acquisition assemblies for the meters forming one and the same population.

Historically, the world of remote water meter reading has been divided into two approaches:
  the first for distributers who had a requirement for precise and time-stamped data, both for tracking their installations and for tracking a few large accounts. The requirement for information is then frequent, that is to say daily in most cases, and precise in terms of timing. Cost is often of lesser importance in relation to the requirement, this having led these distributers to use telephone techniques, either RTC, or in the event of difficulties in obtaining a telephone line, GSM and its derivatives GPRS and SMS,
  the second for the world of property managers who desired to obtain all the readings of their water meters on a precise date for billing water charges. Precise timing is then fairly insignificant, but cost is a fundamental factor. These property managers and their providers have thus been led to envisage communications in Walk-by radio mode, (that is to say with a reader picking up the radio emissions from a distance of a few tens of meters), then more recently in fixed-station mode. Receivers have then been contemplated that recover the information from the nearby meters by RF mode, either in short range mode via repeaters, or in long range mode. These receivers then return all the information via the more expensive RTC/GSM means, but this cost is then distributed over a set of metering points and becomes acceptable. This solution developed within properties was thereafter naturally extended to the reading of all the customer meters of water managers.

What is more, it became impossible to guarantee emission at a fixed time for all the transmitters. As has been seen, a given receiver must pick up several tens of transmitters, but this receiver being incapable of picking them up simultaneously, the radio emissions are often made in a desynchronized manner, or indeed in a random manner about a given emission frequency (for example 12 Hours plus or minus ten minutes) for one and the same receiver.

The split between these two approaches was also accentuated by the management of the energy on the metering point. Specifically, in contradistinction to other fluids, in particular electricity, there is no energy feed on water meters.

RTC/GSM links, with energy-greedy modems, have therefore been indicated in the case of an absolute requirement for information with time-stamping; this requirement has been alleviated directly via a mains link, or by default via sizeable batteries whose replacement was frequently accepted, for example over periods of the order of a few months. These constraints are generated on only a few large accounts and therefore have little impact globally on the economy of the service as a whole. But this solution once adopted makes it possible to scale down the links between base and collection server and the metering points, in both directions (from the metering point to the server or vice versa). Time setting is thus carried out on the local clocks of the meters or readings are collected at the frequency desired.

Conversely, the requirement for collection in the divisional and customer management world remained a simple requirement for an at best monthly reading, and energy management in the form of an autonomous battery of very long duration of the order of fifteen years. Under these conditions, it was unthinkable to envisage frequent, complicated, bi-directional communications or to envisage frequent precise time-stampings. The most that can be done in this regard remains the storage of a so-called "anniversary" reading at most once or twice a year on the basis of a local clock that is time-stamped very rarely (if indeed ever).

The management requirements of a water network are akin to the well known requirements of an electricity network. Production occurs on the basis of automated constant capacity installations that can produce 24H/24H. Conversely, customers consume in a very spiky manner during the day (morning and evening), generating very significant consumption peaks: in the profession, it is considered that the maximum consumption flow rate may be around 1.8 times the mean consumption over the day.

This shift between production capacity and spiky requirement is alleviated by conventional stock management means:
  Water reservoirs: the profession often considers that it is unreasonable not to possess fewer than 12 hours of consumption of storage capacity, prompting the creation of reservoirs with a capacity of several thousand cubic meters,
  Networks dimensioned to carry the peak flow rates.
These means are of course a source of significant investment and management cost overheads. It is therefore of interest to seek means inducing consumers—and preferably heavy consumers—to decrease their consumption at peak periods. This search is all the more crucial as high flow rate demand can lead to consequent pressure dips in the water networks, inconveniencing users who wish to be supplied at the same moment. The more significant the global consumption and the flow rates to be carried, the more significant is this phenomenon.

A solution via communications by modem and RTC/GSM link is admittedly available but it exhibits the drawback of requiring distinct management of the communications with different protocols. It also requires a return to relatively expensive hardware compared with that of remote reading in RF mode.

In order to alleviate the drawbacks of the existing devices, the inventors have developed, this forming the subject of the invention, a remote water meter reading device comprising a consumption data acquisition assembly and comprising at least one radio emitter for transmitting the information acquired, at least one radio receiver integrated into the acquisition assembly in such a way as to render said device communicating in both directions so as to receive the information from a central facility and an antenna so that said central facility can send time-stamping information so that this information transmission taken into account by said radio receivers makes it possible to guarantee exact time-stamping of all the acquisition assemblies for the meters forming one and the same population, which is characterized in that said meter starts a measurement of volume consumed on a schedule determined by a first time-stamping received from the central facility by the receiver and stops it on a schedule determined by a second time-stamping received from the central facility by the receiver, the volume consumed in the interval between the two time-stampings being stored in a memory then transmitted to said central facility by way of the emitter at a deferred schedule.

It turns out in fact to be easy in the mode of operation of the device according to the invention to dispatch a single information cue at a fixed schedule, such as a time-stamping to the whole population of meters under management from the central facility. However, the uploading of the information from all the meters of the population of meters to the central facility cannot be done in a concomitant manner for all the meters. It is thus preferable to store the information to be dispatched in a memory of the meter and to transfer the information stored in a deferred manner at a predetermined or random schedule in the course of which most of the other meters will be silent.

Advantageously, the device according to the invention additionally comprises a screen making it possible to view the schedule and the period during which the consumption takes place.

Preferably, said emitter, said receiver and said acquisition assembly are disposed in such a way that they can be integrated into one and the same package and driven by a common electronic card and powered by one and the same energy source.

More preferably, the remote reading device according to the invention additionally comprises at least one repeater disposed between the meter and central facility so as to take up and transfer the radio emission from the meter to the central facility and vice versa.

More preferably still, said radio emitter and said radio receiver both operate on free frequencies.

As a variant, at least said radio emitter or at least said radio receiver operates on a dedicated frequency.

Within this framework, the power of said radio emitter or of said radio receiver operating on a dedicated frequency is greater than the maximum limit permitted for the free frequencies.

In a particular embodiment of the device according to the invention, in which the meter is a mechanical meter, equipped with a transducer transforming the mechanical movements of the meter into electrical pulses, said acquisition assembly is disposed against the transducer to which it is secured, one and the same energy source powers the transducer and the assembly and said antenna is linked to the emitter and to the receiver by means of a cable, so that the antenna can be placed some distance from the meter.

More particularly, in the case of a meter disposed in a manhole, said antenna is disposed in the upper part of said manhole.

More particularly still, in the case of a meter disposed in a manhole furnished with a cover, said antenna is integrated into the cover of said manhole.

In this particular realization, if the cover is metallic, said antenna consists of the cover of the manhole.

As a variant, if the cover is made of an electrically non-conducting material, said antenna is embedded or molded in said cover.

More particularly in the case of a meter disposed in a manhole furnished with a cover, the cover comprises on its lower face, a connector which is linked to an end of the antenna and into which can be plugged the radio cable link to the emitter and to the receiver.

Preferably, said cable is a coaxial cable.

Advantageously, said energy source is chosen from among cells and/or batteries.

The device according to the invention therefore relates to a bi-directional RF radio transmitter (emitter and receiver) that emits on the same radio system as conventional reading transmission apparatuses, and can be time-stamped by RF link.

Such an apparatus makes it possible to be able to arrange on one and the same population of remotely read meters, on the one hand conventional transmitters for transferring conventional information regarding volume consumed, minimum maximum consumption flow rate, etc, at a random schedule, and on the other hand transmitters that are time-stamped at the desired frequency and that can be parametrized from the receiver or the database/server, dispatching stored readings at the desired dates and times.

The device according to the invention confers the main advantages of
  allowing the management of hourly tariff rates, and
  allowing the management of a single transmission protocol,
  allowing the use of the RF transmission network fitted for the requirements of customers not requiring any time-stamped management of the readings, therefore making it possible to decrease investment costs.

For this purpose, the information transfer radios have been rendered bidirectional. The radio then manages two services beyond its conventional information transmission function:
  the management of precise time-stamping by virtue of transmission from the server, and
  the transmission to a local display of the consumptions per predefined time slot, either by virtue of radio emission, or by any other means.

Such functionalities readily make it possible to define an incentivizing water tariff rate at consumption withdrawal times for heavy consumers that can shift their demand to the night, such as for example, in a non-exhaustive manner:
  golf clubs and their sprinklers,
  municipal sprinklers, and
  swimming pools admitting the public.

Figure 2:
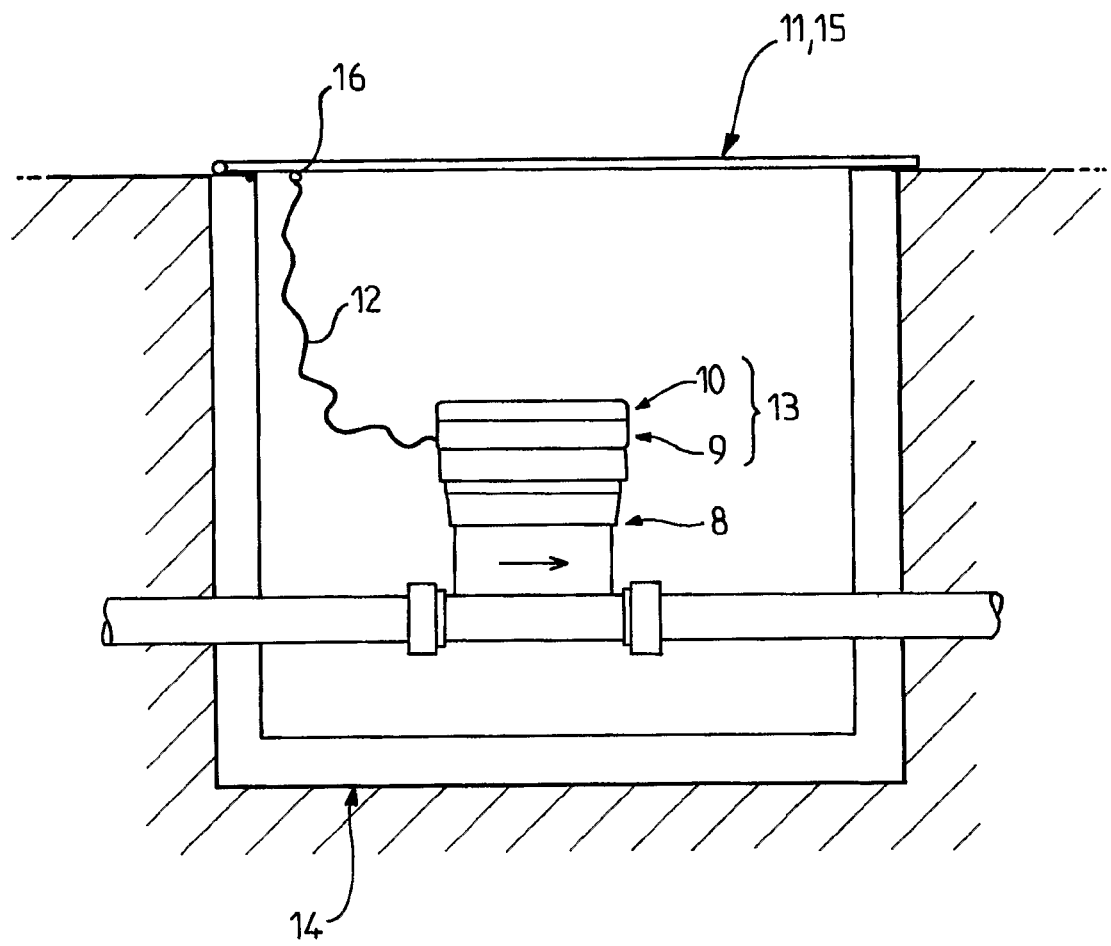

The invention will be better understood on reading the detailed but nonlimiting description, given hereinafter with reference to the drawings in which:

FIG. 1 represents an operating diagram of the device according to the present invention, and FIG. 2 represents a device according to the present invention disposed in a manhole furnished with a metallic cover acting as antenna.

Represented in FIG. 1 is an operating diagram of a network of devices for remotely reading water meters according to the present invention.

These devices 1 (detailed in FIG. 2 in a particular embodiment) consist of a meter, in particular a mechanical meter equipped with a transducer placed against the meter and transforming the mechanical movements of said meter into electrical pulses, a consumption data acquisition assembly for acquiring electrical pulses, comprising at least one radio emitter for transmitting the information acquired and an antenna.

These devices 1 additionally comprise a radio receiver integrated into the acquisition assembly in such a way as to render said device communicating in both directions so as to receive the information from a central facility 2 and in particular a time-stamping.

Represented at one and the same time in FIG. 1 are devices 1 installed in private residences 3 of the chalet type and in sets of properties 4 grouping together the consumptions of all the residents.

It should be noted that to facilitate the reading of the drawing, the devices 1 and 2 are represented on a much larger scale than the properties. The dimensions of the devices 1 are only of the order of some ten centimeters.

The devices 1 can communicate either directly with the central facility 2, for example disposed on top of a property 5 situated in the heart of the population of installed devices, or else, in the case of a highly urbanized and not very open field, with repeaters 6 disposed at regular intervals between the devices 1 and the central facility 2 so as to counterbalance the loss due to obstacles, the repeaters in their turn transmitting the information received to the central facility 2 or to the device 1 depending on the direction of the information.

It is thus possible to operate equally well with free frequencies, in particular when the use of repeaters 6 is necessary, or with dedicated frequencies in particular in the case of an open field. The benefit of using a dedicated frequency is the ability to increase the emission power and therefore the useful distance between the emitter of the device 1 and the receiver 2 or 6. In the case of free frequencies, in particular in an urban setting, the range of such a device is only a few tens of meters whereas it reaches 500 meters to 1 kilometer with a dedicated frequency. In an open field, that is to say one that is slightly urbanized, the range of the device at dedicated frequency can reach several kilometers. Hence it is thus possible to reduce the number of repeaters, or indeed dispense with them. These repeaters 6 are placed so as to resume and transmit the information received from the device 1 up to an acquisition central facility 2. By increasing the range of the emitters, it is therefore possible to decrease their utility and thus decrease the cost of an installation.

At journey's end, the information collected by the central facility is transferred to a database 7 from where information and in particular a time-stamping can be dispatched in the opposite direction.

FIG. 2 illustrates a particular exemplary embodiment of the device according to the invention.

The latter is a remote water meter reading device comprising a mechanical meter 8, a transducer 9 placed against the meter 8 and transforming the mechanical movements of said meter 8 into electrical pulses, an assembly for acquiring the electrical pulses 10 comprising a radio emitter for transmitting the information acquired and a radio receiver integrated into the acquisition assembly 10 so as to render said device communicating in both directions so as to receive the information from a central facility and in particular a time-stamping.

This device is also furnished with an antenna 11.

This antenna 11 is placed some distance from the meter and is linked to the radio assembly (emitter and receiver) by means of a cable 12.

In the example represented, said acquisition assembly 10 and the transducer 9 are, moreover, disposed so as to be able to be integrated into the same block or package 13 and are driven by a common electronic card and one and the same single energy source powers the transducer 9 and the acquisition assembly 10.

Thus, the transferring of the electrical pulses generated by the transducer 9 to the acquisition assembly 10 is therefore carried out in a direct manner.

This device makes it possible to circumvent most of the drawbacks encountered in the transmission of information by radio, namely, the placement of the antenna, departure point of the radio wave at the most appropriate location for the cleanest possible emission and reception, doing so merely by off-siting the antenna 11, its cable 12 which links it to the acquisition assembly 10 possibly being very long. It also allows significant savings by minimizing the cost of making the device and by reducing servicing and consumption to the minimum. Here only one single energy source is used, for example cells or batteries, and only one single electronic card has been made.

In practice, the cable 12 linking the antenna 11 to the acquisition assembly 10 is a coaxial cable.

By off-siting the antenna 11, it is thus possible to use any metallic or electrically conducting device to play this role. In the case represented here, the volumetric meter 8 is installed in a buried manhole 14 furnished with a cover 15. It is therefore possible to use this cover 15 in the guise of antenna 11 by wiring it to the acquisition assembly 10 by way of the cable 12. To facilitate this connection, it is possible to envisage a connector 16 disposed on the cover 15 and into which the radio cable 12 link to the emitter/receiver is plugged directly.

In the case where the cover 15 is made of an electrically non-conducting material, said antenna 11 is then embedded or molded in said cover 15. In the same manner, a connector 16 linked to an end of the antenna 11 and into which the radio cable 12 link to the emitter/receiver may be plugged can be envisaged.

This typical case is not represented here.

The fact of using the cover 15 in the guise of antenna 11 or in the guise of antenna support 11 makes it possible to have a radio wave departure point situated at ground level rather than a certain distance under the earth, in the case of a buried meter 8. This arrangement makes it possible to improve the efficiency of the communication between the device and the central facility or the repeater.

Moreover, the device will allow much easier installation. Specifically, the technician will not have to intervene in the manhole in order to fix an antenna or a radio block, this sometimes being tricky on account of the difficulty of accessibility inside the latter. It then suffices to fit the meter according to the invention and to couple the cable to the cover in the case of a metallic cover, possibly to replace the cover with another where a connector will be disposed. The same holds for manholes whose cover is not electrically conducting. Simple replacement of the cover will allow easy coupling of the meter to its antenna and practical installation of the device as a whole.

The invention thus described is perfectly suited to water distribution but the technology described can be carried over perfectly to any other fluid whose flow rate is measured mechanically, such as for example gas.

Although the description has been given mainly with regard to a mechanical meter, the invention applies to any type of meter, in particular electronic.

The invention claimed is:

1. A remote water meter reading device, comprising
a consumption data acquisition assembly;
at least one radio emitter for transmitting consumption information;
at least one radio receiver integrated into the acquisition assembly for receiving time-stamping information from a central facility, said time-stamping information being used by the acquisition assembly of a meter within a population of meters; and an antenna linked to the emitter and to the receiver to enable bidirectional communications, wherein said meter starts a measurement of a volume of water consumed on a start schedule determined by a first time-stamping received from the central facility by the receiver and stops the measurement on a stop schedule determined by a second time-stamping received from the central facility by the receiver, the volume of water consumed in the interval between the first and second time-stampings being stored in a memory then transmitted as part of the consumption information to said central facility in accordance with a predetermined schedule.

2. The remote reading device as claimed in claim 1, further comprising a screen making it possible to view the start and stop schedules and a period during which the consumption takes place.

3. The remote reading device as claimed in claim 1, wherein said emitter, said receiver and said acquisition assembly are disposed in such a way as to be able to be integrated into one and the same package and driven by a common electronic card and powered by a single energy source.

4. The remote reading device as claimed in claim 3, wherein said energy source is chosen from among cells and/or batteries.

5. The remote reading device as claimed in claim 1, further comprising at least one repeater disposed between said device and central facility so as to take up and transfer a radio emission from the meter to the central facility and vice versa.

6. The remote reading device as claimed in claim 1, wherein said radio emitter and said radio receiver both operate on free frequencies.

7. The remote reading device as claimed in claim 1, wherein at least said radio emitter or at least said radio receiver operates on a dedicated frequency.

8. The remote reading device as claimed in claim 7, wherein the power of said radio emitter or of said radio receiver operating on a dedicated frequency is greater than the maximum limit permitted for the free frequencies.

9. The remote reading device as claimed in claim 1, in which the meter is a mechanical meter, equipped with a transducer transforming the mechanical movements of the meter into electrical pulses, wherein said acquisition assembly is disposed against the transducer to which it is secured, that a single energy source powers the transducer and the assembly and that said antenna is linked to the emitter and to the receiver by means of a cable, so that the antenna can be placed some distance from the meter.

10. The remote reading device as claimed in claim 9, wherein said cable is a coaxial cable.

11. The remote reading device as claimed in claim 1 for the meter disposed in a manhole, wherein said antenna is disposed in an upper part of said manhole.

12. The remote reading device as claimed in claim 11 for the meter disposed in a manhole furnished with a cover, wherein said antenna is integrated into the cover of said manhole.

13. The remote reading device as claimed in claim 12, wherein the cover is metallic and said antenna consists of the cover of the manhole.

14. The remote reading device as claimed in claim 12, wherein the cover is made of an electrically non-conducting material and said antenna is embedded or molded in said cover.

15. The remote reading device as claimed in claim 12, wherein the cover comprises, on its lower face, a connector which is linked to an end of the antenna and into which can be plugged a radio cable link to the emitter and to the receiver.

* * * * *